(12) United States Patent
Rapeaux et al.

(10) Patent No.: US 10,741,350 B2
(45) Date of Patent: Aug. 11, 2020

(54) ELECTRICAL PROTECTION UNIT INCLUDING A CURRENT LIMITER DEVICE

(71) Applicant: Schneider Electric Industries SAS, Rueil Malmaison (FR)

(72) Inventors: Michel Rapeaux, Grenoble (FR); Eric Domejean, Voreppe (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 25 days.

(21) Appl. No.: 15/944,078

(22) Filed: Apr. 3, 2018

(65) Prior Publication Data

US 2018/0366289 A1    Dec. 20, 2018

(30) Foreign Application Priority Data

Jun. 16, 2017   (FR) .................................. 17 55496

(51) Int. Cl.
  *H01H 71/18*        (2006.01)
  *H01H 83/20*        (2006.01)
  (Continued)

(52) U.S. Cl.
  CPC ............ *H01H 71/18* (2013.01); *H01H 71/14* (2013.01); *H01H 71/7427* (2013.01);
  (Continued)

(58) Field of Classification Search
  CPC .... H01H 71/18; H01H 71/14; H01H 71/7427; H01H 83/20; H01H 2033/163; H01H 2071/749; H01H 3/025
  (Continued)

(56) References Cited

U.S. PATENT DOCUMENTS 4,583,146 A  *  4/1986  Howell ................... H01H 9/42
                                                    361/11
4,641,052 A      2/1987  Kobayashi
                         (Continued)

FOREIGN PATENT DOCUMENTS

DE           42 28 297 A1      3/1994
DE      10 2005 006 953 A1     8/2006
                        (Continued)

OTHER PUBLICATIONS

EPO machine translation of Wilhelm DE 102005006953 A1 (Year: 2006).*

(Continued)

*Primary Examiner* — Jacob R Crum
(74) *Attorney, Agent, or Firm* — Oblon, McClelland, Maier & Neustadt, L.L.P.

(57) ABSTRACT

An electrical protection unit A including a main conductor and, for each main conductor, a current limiter device connected in series with the main conductor to limit the current when a current or temperature threshold is exceeded, the limiter device including an element made of a material having a positive temperature coefficient, called PTC, and being capable of controlling a device for tripping the mechanism M for opening the contacts of the protection unit D, to cause the opening of the contacts of the unit when the threshold is exceeded leading to a change of state of the element between a low resistance state and a high resistance state. The PTC element includes the trip device, in such a way that this element itself provides the functions of fault current limitation and of tripping the mechanism for opening the contacts.

15 Claims, 4 Drawing Sheets

(51) Int. Cl.
*H01H 71/74* (2006.01)
*H01H 71/14* (2006.01)
*H02H 3/02* (2006.01)
*H01H 33/16* (2006.01)

(52) U.S. Cl.
CPC ....... *H01H 83/20* (2013.01); *H01H 2033/163* (2013.01); *H01H 2071/749* (2013.01); *H02H 3/025* (2013.01)

(58) Field of Classification Search
USPC .......................................................... 337/125
See application file for complete search history.

(56) References Cited

U.S. PATENT DOCUMENTS

| | | | |
|---|---|---|---|
| 5,644,283 A | 7/1997 | Grosse-Wilde et al. | |
| 5,663,861 A * | 9/1997 | Reddy | H01C 1/1406 361/103 |
| 5,675,303 A * | 10/1997 | Kelaita, Jr. | H01H 71/462 335/172 |
| 6,040,755 A * | 3/2000 | Abe | H01C 1/1406 338/22 R |
| 6,128,168 A * | 10/2000 | Arnold | H01H 9/42 338/21 |
| 6,313,723 B1 * | 11/2001 | Chen | H01H 83/20 335/13 |
| 2003/0027447 A1 * | 2/2003 | Cooper | H01R 13/53 439/181 |
| 2004/0066270 A1 * | 4/2004 | Wang | H01C 1/1406 338/22 R |
| 2006/0186090 A1 * | 8/2006 | Kang | H01H 1/2016 218/10 |
| 2010/0013591 A1 * | 1/2010 | Koyama | C22C 14/00 337/14 |
| 2015/0124366 A1 | 5/2015 | Tseng et al. | |

FOREIGN PATENT DOCUMENTS

| | | |
|---|---|---|
| EP | 0 179 978 A2 | 5/1986 |
| EP | 0 655 760 A2 | 5/1995 |
| WO | WO 93/07667 | 4/1993 |

OTHER PUBLICATIONS

French Preliminary Search Report dated Feb. 7, 2018 in French Application 17 55496 filed on Jun. 16, 2017 (with English Translation of Categories of Cited Documents and Written Opinion).

* cited by examiner

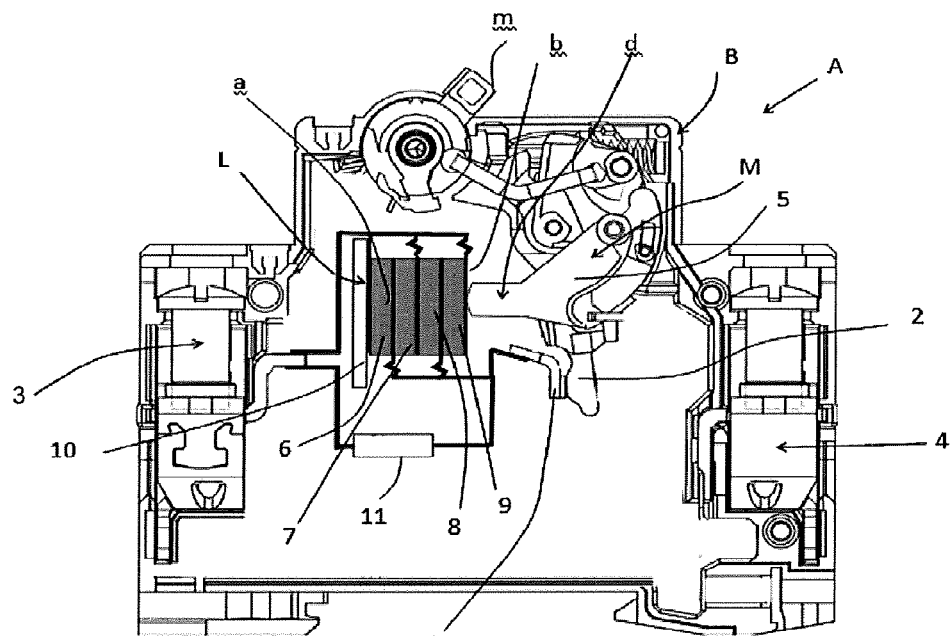
Fig..1.
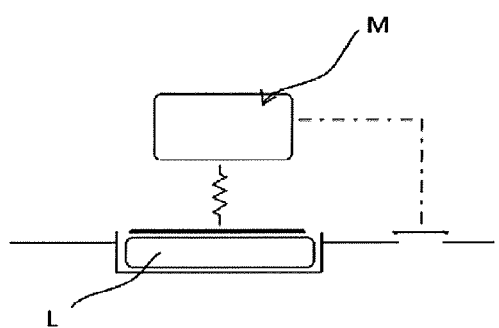
Fig..2.

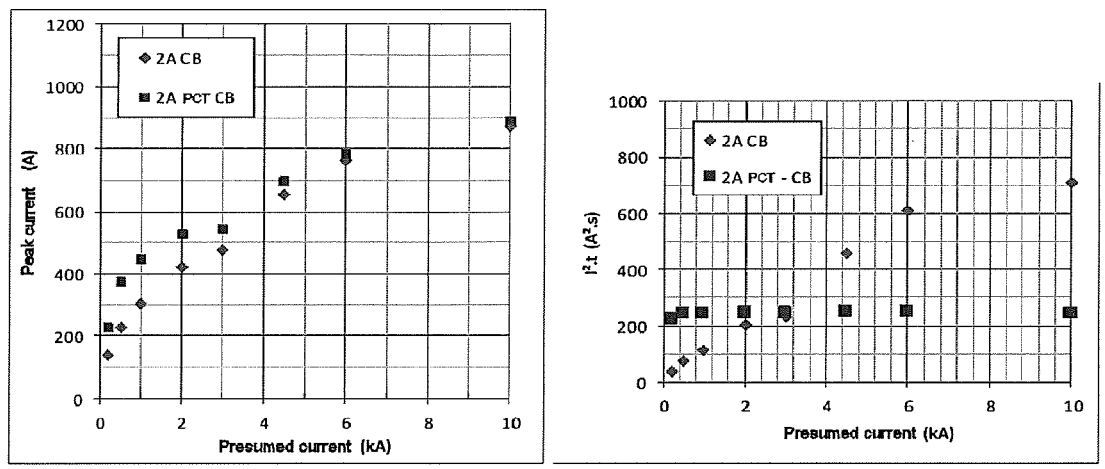
Fig..6. Fig..7.
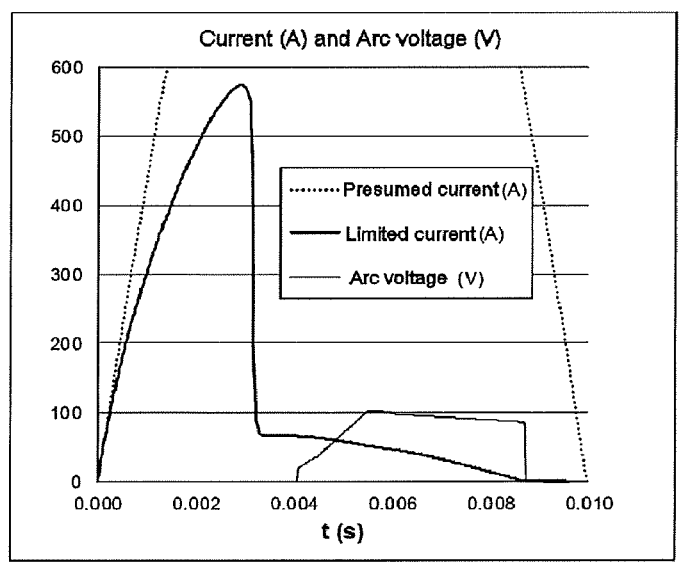
Fig..8.

ELECTRICAL PROTECTION UNIT INCLUDING A CURRENT LIMITER DEVICE

TECHNICAL FIELD

The present invention relates to an electrical protection unit comprising at least one main conductor and, for the or each main conductor, at least one current limiter device connected in series with said main conductor in order to limit the current when a current or temperature threshold is exceeded, said limiter device including an element made of a material having a positive temperature coefficient, called PTC, and being capable of controlling means for tripping the mechanism for opening the contacts of the protection unit, so as to cause the opening of the contacts of the unit when the aforementioned threshold is exceeded leading to a change of state of said element between a low resistance state and a high resistance state.

PRIOR ART

Those circuit breakers referred to as low-rating circuit breakers usually employ a magnetic coil composed of a large number of turns along with an element referred to as a heater associated with a bimetal strip, the coil acting both as means for detecting short circuits and as means for actuating the opening mechanism of the circuit breaker, while the heater allows the bimetal strip to bend in the event of a current overload and also constitutes a means for actuating the aforementioned opening mechanism.

This architecture results in a substantial value for the overall resistance of the circuit breaker and hence in substantial losses due to Joule heating (typically higher than 2 W at nominal current).

Document U.S. Pat. No. 5,999,384, describing a miniature circuit breaker, is known, in which a PTC component replaces the bimetal strip, the coil and the arc extinguishing chamber. The PTC component provides the fault (overload or short-circuit) detection function, limits the fault current, and cooperates with a coil to trip a mechanism for opening the contacts of the unit.

Thus, when a short-circuit fault occurs, the substantial short-circuit current very quickly heats up the PTC component (in a few milliseconds), which causes the resistance of the PTC component to increase, thereby increasing the value of the current through the coil so as to open the contacts of the unit, in the same way as when an electrical overload occurs, but more quickly.

SUMMARY OF THE INVENTION

The present invention provides an electrical protection unit including a current-limiting device, said unit being simplified in terms of design, thereby allowing its cost to be decreased, and in which losses due to Joule heating are significantly decreased.

To this end, the subject of the present invention is an electrical protection unit of the type discussed above, this unit being characterized in that said PTC element includes the aforementioned trip means, in such a way that this element itself provides the functions of fault current limitation and of tripping the mechanism for opening the contacts.

According to one particular feature, said PTC element further includes means for detecting overload faults and means for detecting short-circuit faults.

According to another feature, the aforementioned trip means are controlled by the variations in size, along a preferred direction, of the aforementioned PTC element, during the aforementioned change of state, this variation in size being capable of causing a portion of the PTC element to move in the direction of a trip bar belonging to the aforementioned trip means.

According to another feature, the aforementioned trip means are controlled by the variation in the thickness of the PTC element during the aforementioned change of state.

According to another feature, this unit includes means, called amplification means, making it possible to exert, on the basis of a small movement of a portion of the aforementioned element, a force of higher intensity.

According to another feature, the aforementioned limiter device includes multiple PTC elements stacked along the aforementioned preferred direction and electrically connected in parallel.

According to another feature, the number of stacked elements is comprised between two and ten.

Advantageously, the number of stacked elements is four.

According to another feature, this unit includes means for limiting the volume expansion along at least one direction other than the preferred direction.

According to another feature, the aforementioned means include a metallization produced on at least one face of said element, this metallization being likely to promote the adhesion of the filled polymer, for example by means of a dendritic structure or the production of micropores via chemical etching.

According to another feature, the thickness of this metallization is greater than 50 µm when it is made of copper, and greater than 35 µm when it is made of nickel.

According to another feature, the aforementioned limiter device further includes at least one shunt that is connected in parallel with at least one PTC element, respectively, and makes it possible to set the maximum value of the limited current after the transition of the PTC element.

According to another feature, the resistive value of the (or of each) shunt is comprised between ten times and twenty times the value of the corresponding PTC resistance at room temperature.

According to another feature, the aforementioned limiter device further includes at least one component, referred to as an overvoltage protector, that is connected in parallel with at least one PTC element, respectively, and is intended to limit potential overvoltages that are liable to damage the PTC component.

According to another feature, the or each PTC element is produced on the basis of a semi-crystalline polymer, such as polyethene, polypropene, etc.

According to another feature, this unit is a miniature circuit breaker.

However, other advantages and features of the invention will become more clearly apparent in the detailed description that follows with reference to the appended drawings, which are given solely by way of example and in which:

FIG. 1 is a top view of a circuit breaker according to the invention, from which the cover has been removed so as to show its interior portion;

FIG. 2 is a schematic representation, illustrating the operation of a limiting device according to the invention;

Figure 3:
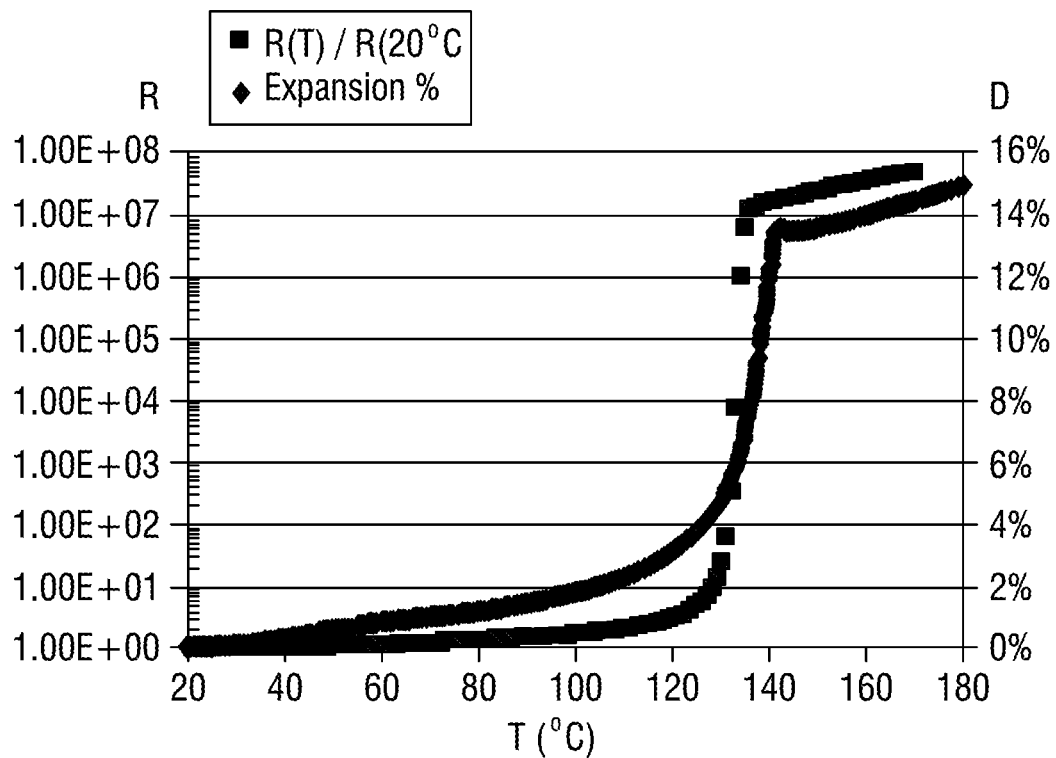
FIG. 3 is a graphic representation illustrating the variation in the resistance of the PTC component (left-hand scale) and in the volume expansion as a percentage (right-hand scale), with temperature.

FIGS. 6 and 7 graphically represent the value of the thermal stress and the peak current, respectively, according to the current, in the case of a conventional circuit breaker for one of the curves, and in the case of a circuit breaker according to the invention, for the other curve; and FIG. 8 graphically represents, as a function of time, the fault current through a unit according to the invention before limitation by the PTC, this same fault current after limitation by the PTC, and the arc voltage, in the case of a circuit breaker according to the invention.

FIG. 1 shows a low-voltage circuit breaker A including, in a manner known per se, housed in a substantially parallelepipedal housing B, two contacts 1, 2, of which the fixed one 1 is electrically linked to one of the terminals 3, referred to as the input terminal, of the unit, while the other 2, referred to as the movable contact, is electrically linked to the other 4, referred to as the output terminal, of the two terminals 3, 4. This movable contact 2 is capable of being moved between a closed position of the two contacts 1, 2 and a position in which these same contacts are separated, via an opening and closing mechanism M which is capable of being controlled either manually or automatically.

Manual control is performed via a lever m that is capable of being actuated by a user. The automatic opening of the contacts 1, 2 is performed via trip means d which are controlled either by means for detecting a fault of thermal origin signalling an electrical overload, or by means for detecting a fault of magnetic origin, signalling a short-circuit fault. These trip means are intended to cooperate with a trip bar 5 which is capable, when it is actuated, of releasing a mechanical latch, the effect of this release being to cause the arc contacts 1, 2 to open automatically.

This unit further includes a current-limiting device, placed on the current line between the terminal referred to as the input terminal 3 of the unit and the fixed contact 1, this device being intended to limit the value of the fault current before the contacts 1, 2 are opened.

According to the described embodiment, this limiting device includes an assembly of multiple components 6, 7, 8, 9, each consisting of a material having a positive temperature coefficient, referred to as a PTC material. In a manner known per se, at the normal operating temperature, the electrical resistance of this type of material is very low. In the event of an overcurrent passing through this material, the increase in temperature of the material above a critical value causes a rapid increase in the electrical resistance of said material allowing it to limit the increase in current. This increase in resistance is caused by a change of state of the material of the element between a state referred to as the non-transitioned state and a state referred to as the transitioned state.

According to this particular embodiment of the invention, this limiting device consists of a stack of four PTC components 6, 7, 8, 9, each of these components being substantially parallelepipedal in shape, these elements being bonded by their face having the largest area. This assembly of components forms a substantially parallelepipedal block L, this block being attached by one of its lateral faces a to a support element 10 which is fixed with respect to the housing of the unit.

In a manner known per se, each component undergoes an expansion during the aforementioned change of state, this expansion resulting in a volume expansion which may reach up to +10% or 20% of the initial volume.

According to the invention, this volume expansion of the components is used to trip the mechanism M for opening the aforementioned contacts, such as illustrated schematically in FIG. 2. In FIG. 1, it is seen that the face b of the aforementioned block L of components, which is opposite that to which the aforementioned support 10 is attached, cooperates with the trip bar 5, such that a volume expansion of the assembly of the components in the direction of this trip bar 5 causes said bar to be actuated, and hence the mechanism M for opening the contacts to be tripped.

Thus, according to this particular embodiment of the invention, this limiting device simultaneously performs the functions of detecting faults of thermal origin, of detecting faults of magnetic origin, of arc extinguishing chamber, of fault current limitation and of means d for tripping the mechanism for opening the contacts.

FIG. 3 illustrates, for a PTC component based on carbon black-filled polythene, the variation in the resistance R of the PTC component (left-hand scale) and the volume expansion D as a % (right-hand scale) with temperature T.

The implementation of the actuator function (tripping the circuit breaker) exploits the expansion of the component along a preferred direction, for example in the direction of the thickness of the component. To obtain a maximum expansion along this direction, it is desirable to limit the volume expansion along the other two directions: this may be achieved for example by various means such as dendritic metallization (which technology is known for obtaining a high level of contact resistance of the metallization provided by the dendrites clinging to the PTC material). This metallization must be thick enough (typically thicker than 50 μm for copper or 35 μm for nickel) not to break during the volume expansion of the component.

Figure 4:
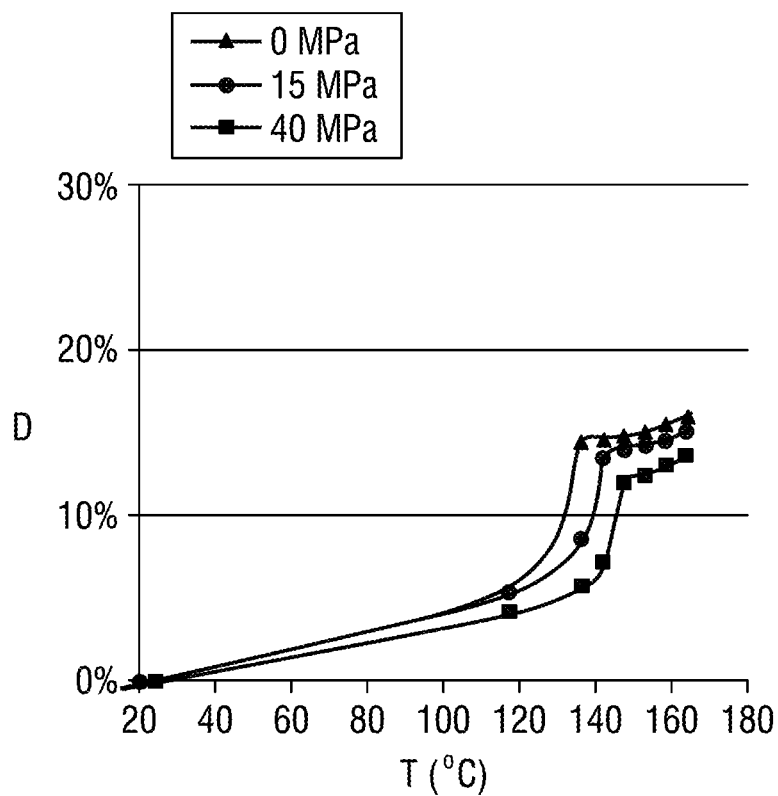
FIG. 4 is a graphic representation illustrating the volume expansion of a PTC material with temperature for various loads applied to the material.
Figure 5:
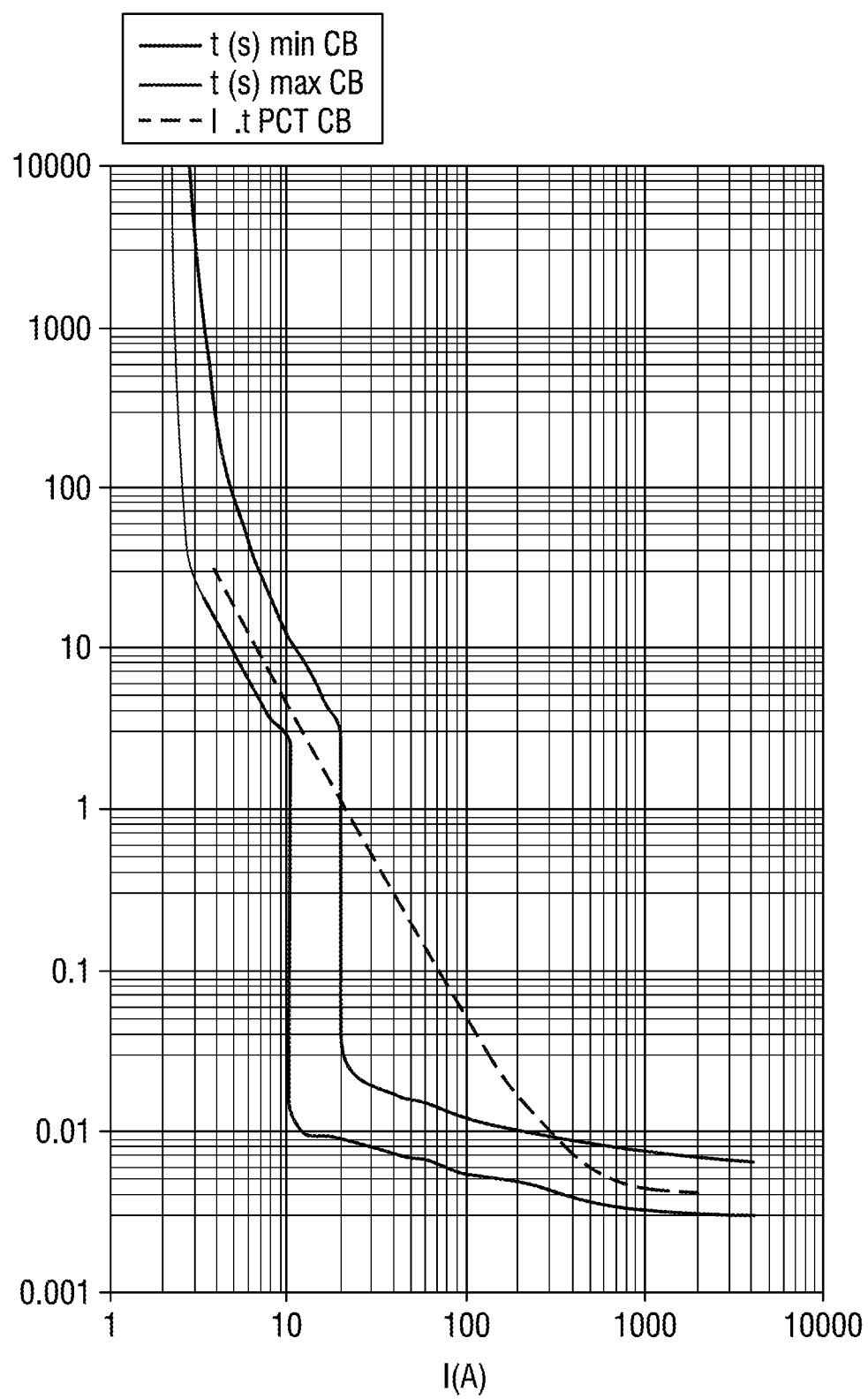
FIG. 5 illustrates the typical trip curve of a standard 2 A circuit breaker, graphically representing the time required to open the contacts according to the current.

As this is the case for the particular embodiment described in FIG. 1, to obtain an expansion that can be exploited directly by the opening mechanism of the circuit breaker, it is possible to stack the components along the preferred direction (which corresponds to mechanically placing the components in series). The juxtaposition of two to ten components, preferably four, makes it possible to obtain a sufficient expansion in terms of distance (typically of the order of 1 to 2 mm) and in terms of force. FIG. 4 shows the variation in the volume expansion D as a % of a polythene-based PTC material with temperature T and for various loads (MPa) (0 MPa, 15 MPa, 40 MPa) applied to the material. These load values correspond to the forces per unit area delivered by the PTC component for a given expansion. FIG. 5 illustrates the trip curve typical of a 2 A circuit breaker CB (the two curves shown as solid lines corresponding to the minimum and maximum curves, respectively).

The transition of the PTC component is governed solely by heat exchange phenomena (as for a bimetal strip) and is characterized by the equation $I^2 \cdot t = $Constant (curve shown as a dashed line) in adiabatic mode, i.e. for times of less than a few seconds (for which heat exchanges are negligible).

For very short times, typically less than 10 ms, the time required to open the contacts after tripping the mechanism dictates a minimum value for the trip time, shown on the plot opposite by the asymptote towards 3-4 ms.

The particular arrangement consisting in placing the PTC components in parallel electrically and in series mechanically, shown in FIG. 1, makes it possible to obtain both a low resistance for the circuit breaker and a resulting expansion that is sufficient to actuate the trip mechanism. To avoid hindering the expansion of the PTC components, electrical connection will advantageously be made by means of flexible connections, the thickness of which will be of the order of 0.2 mm to 0.4 mm.

The trip ($I^2 \cdot t$) and resistance stresses at room temperature of the PTC (maximum losses due to Joule heating) allow the dimensions of the PTC component to be determined. An example of dimensions for the ratings of 1 A, 2 A and 6 A is given below.

| Rating (A) | CB Resistance (mΩ) | $I^2t \cdot t$ Stress ($A^2 \cdot s$) | PCT Energy Transition (J) | PCT Resistivity (Ω · cm) | PCT Area (cm²) | PCT Thickness (mm) | Number of PCT in parallel | Rshunt (Ω) | CB-PTC resistance (mΩ) |
|---|---|---|---|---|---|---|---|---|---|
| 1 | 2121 | 120 | 18 | 6 | 0.25 | 2 | 4 | 20 | 1132 |
| 2 | 624 | 480 | 70 | 6 | 1 | 2 | 4 | 5 | 283 |
| 6 | 88.6 | 4320 | 630 | 6 | 9 | 2 | 4 | 1 | 32 |

In this table, the unit according to the invention includes four PTCs electrically connected in parallel. To optimize the actuator effect, these PTCs are mechanically connected in series.

The exemplary dimensions given above show that it is possible, by virtue of the invention, to decrease, for example, the total resistance of the circuit breaker, and hence losses due to Joule heating, by a factor of two. As shown in FIG. 1, a shunt 11 is connected in parallel with the block L of PTC components, and makes it possible to set the maximum value of the limited current after the transition of the PTC. The resistive value of this shunt is typically 10 to 20 times the value of the resistance of the PTC block at room temperature.

Lastly, it is advantageous to associate (not illustrated in FIG. 1), in parallel with the block L of PTC components, an overvoltage protection component (of MOV type) to limit potential overvoltages which may damage the PTC components, in particular during a rapid transition thereof.

FIGS. 6 and 7 are graphic representations giving the value of the thermal stress $I^2 \cdot t$ and of the peak current (A) corresponding to a PTC component sized for a rating of 2 A, and associated with a 5Ω shunt. The values of the PTC component and of the shunt have been determined to obtain a maximum peak current value similar to that obtained by the standard circuit breaker.

It should be noted that on these two curves the thermal stress $I^2 \cdot t$ is practically constant for all short-circuit currents between 200 A and 10 000 A. The maximum energy to which the shunt is exposed is of the order of 200 J, which value will be taken into account for the sizing of this same shunt.

The advantages provided by the invention are the following:

Regardless of the type of electrical fault (overload or short circuit) taking place in the circuit, the contacts of the circuit breaker are opened under a limited current (typically a few milliseconds after the transition of the PTCs, this time corresponding to the time required for the mechanism to open the contacts). The value of this limited current is determined simply by the resistive value of the shunt placed in parallel with the PTC components (see FIG. 8, 2 A PTC circuit breaker, 1 kA/240 V short circuit, 5 shunt). This result allows the service life of the contacts of the circuit breaker to be substantially increased. Another option consists in using contact materials which are less noble, and hence less expensive.

The value of the thermal stress to which the circuit breaker and the electrical circuit are exposed in the event of a fault (overload or short circuit) is practically constant, and this is the case regardless of the value of the fault current. This feature guarantees the upstream selectivity of the proposed solution.

Low-rating circuit breakers (typically having a nominal current of less than or equal to 6 A) make use of a magnetic coil composed of a large number of turns and of a heater to allow the bimetal strip to bend in the event of a current overload. This architecture results in a substantial value for the overall resistance of the circuit breaker and hence in substantial losses due to Joule heating (typically higher than 2 W at nominal current) as shown in the table below.

The table below gives the power loss in watts for each rating, per pole:

| | Rating (A) | | | | | | | | |
|---|---|---|---|---|---|---|---|---|---|
| | 0.5 | 0.75 | 1 | 1.2 | 1.5 | 2 | 3 | 4 | 5 | 6 |
| W/pole | 2.2 | 2.96 | 2.3 | 2.4 | 2.1 | 2.5 | 2.2 | 2.4 | 2.5 | 2.7 |

The table below gives the drop in voltage of the device in mV for each rating, per pole:

| | Rating (A) | | | | | | | | |
|---|---|---|---|---|---|---|---|---|---|
| | 0.5 | 0.75 | 1 | 1.2 | 1.5 | 2 | 3 | 4 | 5 | 6 |
| mV/pole | 4400 | 3950 | 2300 | 2000 | 1400 | 1276 | 745 | 600 | 500 | 480 |

It can thus be seen that the proposed solution allows the resistance of the circuit breaker to be significantly decreased. For example, losses due to Joule heating may be halved.

The values of the losses due to Joule heating are given in the product catalogues. The customer may therefore compare the data, which are important for the installer. The lower the losses due to Joule heating, the greater the number of devices in a given space, and the lower the ventilation will be in this space.

Additionally, the simplicity provided allows the cost of the circuit breaker to be substantially decreased.

Of course, the invention is not limited to the embodiment described and illustrated, which has been given only by way of example.

Thus, while according to the described embodiment a single component provides both the current limitation (PTC effect) and trip (actuator effect) functions, this allowing, in particular, both functions to be performed almost simultaneously, the invention also covers the case in which these two functions are dissociated, for example when the actuator is heated indirectly by a PTC element. This solution would however have the drawback of a longer trip time, taking heat transfer into account.

The optimization of the block of PTC components requires a mechanical connection in series associated with an electrical connection in parallel. However, the invention also covers any other combination of placing the elements in series and in parallel, such as a mechanical connection in series and in parallel.

On the contrary, the invention comprises all technical equivalents of the means described and combinations thereof provided that these are implemented according to the spirit of the invention.

The invention claimed is:

1. An electrical protection unit comprising at least one main conductor and, for the or each main conductor, at least one current limiter device connected in series with said main conductor in order to limit a current when a current or temperature threshold is exceeded, said limiter device including a PTC element made of a material having a positive temperature coefficient and being capable of controlling trip means for tripping a mechanism for opening contacts of the protection unit, so as to cause opening of the contacts of the unit when said threshold is exceeded leading to a change of state of said element between a low resistance state and a high resistance state,
   wherein the limiter device includes multiple PTC elements stacked along a stacking direction and electrically connected in parallel along a direction perpendicular to the stacking direction,
   wherein said PTC elements provide the functions of fault current limitation and of tripping the mechanism for opening the contacts, and expansion of the PTC elements in the stacking direction moves said tripping means to open said contacts, and
   wherein said unit comprises a metallization configured to limit volume expansion of the PTC elements along two orthogonal volume directions other than the stacking direction.

2. The electrical protection unit according to claim 1, wherein said PTC element further includes means for detecting overload faults and means for detecting short-circuit faults.

3. The electrical protection unit according to claim 1, wherein the trip means are controlled by variations in size, along the stacking direction, of the PTC elements, during the change of state, said variations in size being capable of causing a portion of the PTC elements to move a trip bar belonging to the trip means.

4. A protection unit according to claim 3, wherein trip means are controlled by variations in the thickness of the PTC elements during the change of state.

5. An electrical protection unit comprising at least one main conductor and, for the or each main conductor, at least one current limiter device connected in series with said main conductor in order to limit a current when a current or temperature threshold is exceeded, said limiter device including a PTC element made of a material having a positive temperature coefficient and being capable of controlling trip means for tripping a mechanism for opening contacts of the protection unit, so as to cause opening of the contacts of the unit when said threshold is exceeded leading to a change of state of said element between a low resistance state and a high resistance state,
   wherein said PTC element includes the trip means, in such a way that said element itself provides the functions of fault current limitation and of tripping the mechanism for opening the contacts, and
   amplification means configured to exert, based on a small movement of a portion of the element, an applied force of higher intensity.

6. The electrical protection unit according to claim 1, wherein the number of stacked elements is comprised between two and ten.

7. The electrical protection unit according to claim 1, wherein the number of stacked elements is four.

8. The electrical protection unit according to claim 1, wherein said metallization is a dendritic metallization formed on opposing side surfaces oriented in the stacking direction of the PTC element.

9. The electrical protection unit according to claim 1, wherein the metallization is produced on at least one face of said element to promote adhesion of a filled polymer.

10. The electrical protection unit according to claim 1, wherein the thickness of said metallization is greater than 50 µm when said metallization is made of copper, and greater than 35 µm when said metallization is made of nickel.

11. An electrical protection unit comprising at least one main conductor and, for the or each main conductor, at least one current limiter device connected in series with said main conductor in order to limit a current when a current or temperature threshold is exceeded, said limiter device including a PTC element made of a material having a positive temperature coefficient and being capable of controlling trip means for tripping a mechanism for opening contacts of the protection unit, so as to cause opening of the contacts of the unit when said threshold is exceeded leading to a change of state of said element between a low resistance state and a high resistance state,
   wherein said PTC element includes the trip means, in such a way that said element itself provides the functions of fault current limitation and of tripping the mechanism for opening the contacts, and
   wherein the limiter device further includes at least one shunt that is connected in parallel with at least one PTC element, respectively, and configured to set the maximum value of the limited current after the transition of the PTC element.

12. The electrical protection unit according to claim 11, wherein the resistive value of the shunt is comprised between ten times and twenty times the value of the corresponding PTC resistance at room temperature.

13. The electrical protection unit according to claim 1, wherein the limiter device further includes at least one overvoltage protector that is connected in parallel with at least one PTC element, respectively, and is intended to limit potential overvoltages that are liable to damage the PTC component.

14. The electrical protection unit according to claim 1, wherein each PTC element is produced on the basis of a semi-crystalline polymer.

15. The electrical protection unit according to claim 14, wherein said electrical protection unit is a miniature circuit breaker.

* * * * *